2,745,819

HALOGEN-CONTAINING RESINS STABILIZED WITH ORGANO-TIN COMPOUNDS

Gerry P. Mack, Jackson Heights, and Emery Parker, New York, N. Y., assignors, by mesne assignments, to Carlisle Chemical Works, Inc., Reading, Ohio, a corporation of Ohio No Drawing. Application April 1, 1952,
Serial No. 279,952

10 Claims. (Cl. 260—45.75)

The invention relates to stabilized halogen-containing resins and compositions containing the same.

It is well known that halogen-containing resins, particularly vinyl chloride resins and resins formed by conjoint polymerization of vinyl chloride with vinyl acetate or other unsaturated compounds polymerizable therewith, are liable to discoloration when subjected to elevated temperatures during or after compounding and also under the influence of prolonged exposure to light. A great number of stabilizers have been proposed for preventing or retarding such discoloration, also organo-tin compounds of which the effectiveness is generally attributed to their ability of binding the hydrochloric acid liberated during the decomposition of the resin.

However, the attempts of taking advantage of the stabilizing properties of organo-tin compounds have met with considerable difficulties due to the fact that the organo-tin compounds available heretobefore for this purpose have certain objectionable properties which reduce their value as stabilizer and affect the quality of the finished resin and articles made thereof in various respects.

Another drawback of the known stabilizers is that they are frequently not compatible with certain plasticizers used in the compounding of vinyl resins.

It is an object of this invention to provide halogen-containing resinous compositions stabilized with organo-tin compounds which have a low vapor pressure and are stable against moisture, and which prevent discoloration, haziness and brittleness of the resin during the processing as well as in the finished product, such as films, sheets, or molded articles, when exposed to heat and light.

Other objects and advantages will be apparent from a consideration of the specification and claims.

According to this invention, we use as stabilizers a new class of organo-tin compounds of the formula (1) 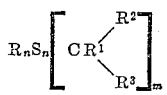

wherein R is an alkyl or aryl group, $R^1$ is hydrogen, alkyl or aryl, $R^2$ and $R^3$ are the same or different negative activating groups, for instance groups containing a carbon-oxygen double bond, a carbon-nitrogen triple bond, an $SO_2$ group or a system of conjugated double bonds; $n$ and $m$ are integer numbers and $n+m$ is always 4.

These new compounds are prepared by reacting in an anhydrous organic solvent in the presence of an alkaline condensing agent an organo-tin halide with organic compounds having activated methylene groups.

Methylene groups are activated by at least two negative groups attached to the carbon atom of the methylene group. Such negative groups are, for instance: the carboxyl group COOH, the carbonyl group CO, the nitrile group CN, the sulphone group $SO_2$, the nitro group $NO_2$, the nitrosyl group NO, double bonds —C:C—, conjugated double bonds —C:C—C:C—, triple bonds, conjugated hydrocarbon rings. The activating groups may comprise two negative groups of the same or similar constitution or different groups. Compounds in which the methylene group is activated by two equal or similar negative groups are, for instance, malonic esters, beta-diketones, disulphones. Examples of compounds where the methylene group is activated by two different negative groups are, for instance, keto-sulphones, beta-keto-carboxylic acid derivatives, aryl benzyl cyanides, aryl alkyl ketones, aryl acetic acids, cyanocetic esters, and many others.

Active methylene groups attached to aromatic or cyclo-aromatic double bond systems, such as in cyclopentadiene, indene, fluorene, triphenyl methane and others, can also be reacted with organo-tin halides and form the corresponding substituted dialkyl or diaryl, trialkyl or triaryl tin derivatives of these hydrocarbons.

In order to have the invention better understood, we will discuss more in detail the reaction of compounds as defined hereinbefore with organo-tin halides. Since there are many organic compounds which contain an activated methylene group and which fall within the generic disclosure of our invention, we shall not attempt to list them all. We give, however, in the following description several groups of such compounds and list in each group representative members of the group which can be used to form products of our invention. We shall then describe examples illustrating the reaction by which the new compounds are obtained.

Organo-tin halides suitable for the reaction are, for instance, dimethyl, diethyl, dipropyl, dibutyl, diamyl, dihexyl, dioctyl, dilauryl, dibenzyl, diphenyl, ditolyl, and other dichlorides or dibromides as well as the corresponding trialkyl and triaryl monohalides.

As an alkaline condensing agent, we prefer to use a low molecular weight alkali metal alcoholate, such as sodium methoxide, sodium ethoxide, sodium isopropoxide, but the alkali metals themselves, also the alkali hydrides, in the finely distributed form may be used with equal success. The reaction is preferably carried out in an inert anhydrous solvent, e. g. an aromatic hydrocarbon such as benzene, toluene or xylene, or anhydrous alcohols or ethers, which do not interfere with the reaction. The presence of water has to be avoided because it would produce undesired side reactions and a partial hydrolysis of the organo-tin halides. For the same reason, the reaction mixture should be protected against the hydrolyzing influence of moisture.

It is of course possible to prepare in each instance first the alkali metal derivative of the compound containing the active methylene group and to react then this isolated alkali metal compound with the organo-tin halide. However, this would constitute an unnecessary complication of the process and it is fully sufficient to condense the reacting compounds under conditions in which the alkali metal derivative is formed in solution as an intermediate product.

The first group of compounds in which a methylene group is activated by two neighboring carboxyl groups is represented by malonic esters, such as methyl, ethyl, propyl, butyl, 2-ethylhexyl, benzyl, cyclohexyl, tetrahydrofururyl, and other malonates.

When the sodium derivatives of these esters are reacted with diakyl or diaryl tin halides in a suitable solvent under complete exclusion of water, compounds of the following formula are obtained.

(2)     $R_2Sn(CR'(COOR'')_2)_2$

With trialkyl or triaryl tin halides the reaction products have the following formula:

(3)     $R_3SnCR'(COOR'')_2$

In both formulae R is alkyl or aryl, R' is hydrogen, alkyl or aralkyl, and R" is the residue of the aliphatic, aromatic, or alicyclic alcohol which had been used for the esterification of the carboxyl groups of the malonic acid.

It will be understood that in this and in succeeding structural formulae and equations applicants are merely giving what they believe to be the reactions and structures of the resulting products. It is intended that the specification and claims shall protect the products of the reactions, even though the precise structures of such products may later be shown to be other than those indicated in this specification.

Other malonic ester type compounds capable of reacting with organo-tin halides are compounds obtained by reacting malonic esters as listed hereinbefore with aldehydes, such as formaldehyde, acetaldehyde, butyraldehyde, benzaldehyde, and others, in the presence of a secondary amine, such as, piperidine or diethylamine. These compounds have the formula (4) 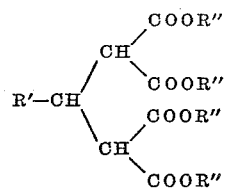

When reacted with organo-tin halides they produce compounds of the Formulae 2 and 3 where R' is the alkylene or arylene residue from the aldehyde used in the condensation, or hydrogen, if formaldehyde was used.

Still other malonic ester derivatives which are suitable for the reaction with organo-tin halides are obtained by condensing malonic esters with unsaturated compounds having activated double bonds, such as methyl vinyl ketone, ethyl acrylate, acrylonitrile, and others.

Organo-tin malonic ester compounds as defined by the Formulae 2 and 3 are liquids having a low vapor pressure and a wide range of solubility. They are soluble in most of the common organic solvents as well as in most plasticizers used in the compounding of vinyl halide polymers. They are fully compatible with halogen-containing resins and constitute a new group of stabilizers which have the particular advantage that also the malonic acid ester moiety of itself is completely compatible with the resins and acts as plasticizer, which property is carried over in the malonic ester tin compound. Therefore, these compounds exert both a stabilizing action and a plasticizing action.

The new organo-tin malonic ester compounds having amyl groups and higher groups on the carboxylic groups are well soluble in mineral oils and may be used as additives thereto.

Beta-diketo compounds are compounds wherein a methylene group is activated by two neighboring carbonyl groups. When their alkali metal derivatives are reacted with organo-tin halides, compounds of the following formulae are obtained:

(5)             $R_2Sn(CR'(COR")_2)_2$
(6)             $R_3SnCR'(COR")_2$

In these Formulae R and R" are alkyl or aryl and R' is hydrogen, alkyl or aralkyl.

It may be possible that these compounds are better represented by a chelate configuration, in which case their structural formulae should be written as follows:

(5a) 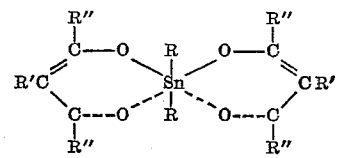

(6a) 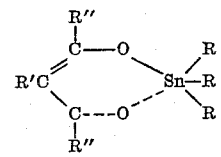

Examples of beta diketones are acetylacetone, propionyl acetone, butyrol acetone, also beta diketones which are mono substituted on the methylene group as 2-methyl acetylacetone, 2-butyl acetylacetone, 2-ethylhexyl acetylacetone, 2-benzyl acetylacetone, aromatic diketones as benzoylacetone, 2-ethyl benzoylacetone, cinnamoylacetone and others.

The reaction products of the beta diketones with organo-tin halides are liquids, which can be distilled under reduced pressure without decomposition and obtained in a pure state. They are stable against hydrolysis and are not decomposed when exposed to moist air. They are soluble in a large number of solvents, also in high boiling esters and hydrocarbons, amides and other compounds used as plasticizers.

A third group of starting materials for the preparation of the new organo-tin compounds are beta-keto-carboxylic acid derivatives of the formula (7)             $RCOCH_2Z$ wherein R is alkyl or aryl and Z an ester group COOR, an amide group $CONH_2$, or a nitrile group CN. When subjecting these compounds to the reaction with organo-tin halides in the manner set forth hereinbefore, compounds of the following formulae are obtained (8) 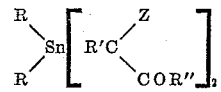

and (9) 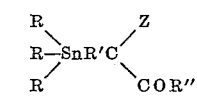

where R and R" are alkyl or aryl radicals, R' is hydrogen, alkyl, aralkyl, or another radical as obtained through a condensation reaction, and wherein Z represents the same groups as in Formula 7. These compounds may also be represented as chelates in formulae similar to those given for the beta-diketo compounds.

As beta-keto-carboxylic acid derivatives, the following may be used:

1. The alkyl or aralkyl or cyclic derivatives of acetoacetic acid $$CH_3COCH_2COOR$$

where R stands for methyl, ethyl, propyl, butyl amyl, hexyl, octyl, nonyl, dodecyl, also for benzyl cyclohexyl tetrahydrofurfuryl, and others.

2. Beta-keto esters derived from the ester condensation of higher fatty acid esters with an acetic acid ester of the general formula $$RCOCH_2COOR'$$

where R·CO is the residue from the condensation of, for example, propionic, butyric, hexoic, 2-ethylhexoic, benzoic, and other esters with the esters of acetic acid having an alcohol residue R' which stands for radicals as enumerated above.

3. Beta-keto amides of the following formula:

$$RCOCH_2CONH_2$$

such as acetoacetic amide, methyl acetoacetic amide, benzoyl acetoacetic amide, and others.

4. Beta-keto nitriles of the following formula:

$$RCOCH_2CN$$

such as methyl cyanoacetone, alpha-methyl acetoacetic acid nitrile, benzoyl acetoacetic nitrile, propionylacetonitrile where R represents an alkyl or aryl radical as enumerated above.

Another group of compounds having an activated methylene group is represented by the sulphones. This large class of organic sulphur compounds may be divided into disulphones, where the active methylene group lies between two SO₂ groups, and in compounds where the methylene group lies between an SO₂ group and another activating group. These second activating groups may be CO, COOR, CONH₂, and CN, and we have accordingly keto sulphones and sulphonyl derivatives of esters, amides, and nitriles.

Examples of such compounds are:

Ethyl methyl sulfonyl acetate
Ethyl phenyl sulfonyl acetate
Phenyl sulfonyl acetonitrile
Para-tolyl sulfonyl acetonitrile
Benzene sulfonyl acetamide
Para-tolyl sulfonyl acetamide
Ethyl sulfonyl acetamide
Phenyl sulfonyl acetone
Para-tolyl sulfonyl acetone
Para-tolyl sulfonyl acetophenone
Di-(methyl-sulfonyl) methane
Di-(ethyl-sulfonyl) methane
Di-(butyl-sulfonyl) methane
Di-(phenyl-sulfonyl) methane The last four compounds may be obtained by the oxidation of the corresponding sulphides.

All these sulfonyl derivatives may be reacted in the described manner with organo-tin halides and form compounds of the following formula

(10) 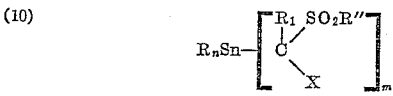

In the formula, R and R'' are the same or different alkyl or aryl groups, R' represents hydrogen, alkyl or aralkyl, and X is a negative constituent such as $SO_2R''$, $COR''$, $COOR''$, $CONH_2$, or CN. In compounds prepared by condensation with organo-tin dihalides $n$ and $m$ is each 2, in compounds prepared with organo-tin trihalides $n$ is 3 and $m$ is 1.

In the foregoing, compounds have been considered which contain a methylene group neighboring two activating groups. However, these compounds can be reacted with organo-tin halides also when a third activating group has been introduced. Such starting materials have the following configuration:

(11) 

where R', R'', and R''', represents the same or different members of the activating groups COR, COOR, CONH₂, CN, R being alkyl or aryl. R' and/or R'' may also be groups containing olefinic bonds or conjugated double bonds of the benzene nucleus or SO₂R groups, R''' being in this case one of the other activating groups recited hereinbefore.

When reacted with organo-tin halides, the following compounds are formed

(12) 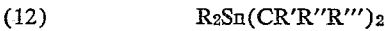 R₂Sn(CR'R''R''')₂ and

(13)  R₃SnCR'R''R''' where R is alkyl or aryl and R', R'', and R''' designate the same groups as in Formula 11.

Other compounds susceptible to the reaction with organo-tin halides are compounds which contain three activating groups in the molecule but where not all three groups are neighboring the methylene groups.

Example of compounds having three negative groups and being adapted for the reaction with organo-tin halides are the following:

Diacetyl acetic esters
Methylene tricarboxylic esters
Cyano malonic esters
Oxalacetic esters
Acetone oxalic esters
Glutaconic esters
Phenyl malonic esters
Phenyl acetoacetic esters
Benzoyl cyano acetic esters
Phenyl oxalacetic esters
Phenyl cyano pyruvic esters
Benzoyl glutaric esters
Cinnamoyl acetone
Phenyl itaconic esters
Para tolyl sulfonyl para ethyl carboxy phenyl sulfonyl methane
Bis-ethyl-sulfonyl-phenyl methane
and others.

We use the new compounds in the monomeric or polymeric state as stabilizers for instance in such amounts that 0.1 to 5 per cent, preferably 0.3 to 3 per cent, of tin by weight of the halogen-containing resin are employed. The new stabilizers may also be used in combination with other organo-tin or tin-free stabilizers. They may be added before, during or after polymerization of the halogen-containing compound and are preferably incorporated in the polymerized resin before compounding it in the rubber mill.

Halogen-containing resins, which are made heat and light resistant by the stabilizers of this invention, include polymers of vinyl chloride and vinyl resins containing vinyl chloride units in their structure, such as copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acrolein, croton aldehyde, vinyl methyl ketone, vinyl methyl ether, vinyl isobutyl ether, and the like; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The following examples will serve to illustrate the invention.

*Example 1*

0.5 of dibutyl tin di(ethyl malonate) obtained by reacting diethyl malonate with dibutyl tin dichloride in toluene solution were dissolved in 34.5 g. of di-2-ethylhexyl phthalate and this solution was mixed with 65 g. of a vinyl chloride-vinyl acetate copolymer resin containing 95 per cent of vinyl chloride and 5 per cent of vinyl acetate. The mixture was then milled on a rubber mill at 325° F. until a uniformly fluxed film was obtained. This film was then heat-pressed at 325° F. between polished steel plates to a film of 40 mil thickness. 1 inch by 2 inch strips of this film were then heat-treated in an air-circulating oven at 325° F. and the color change compared with an identical film containing no stabilizer. After 1 hour and 15 minutes the stabilized film was very slightly yellow whereas the unstabilized film was brown already after 10 minutes.

*Example 2*

1 g. of dibutyl di(acetyl acetonyl) tin, obtained by first preparing the sodium derivative of pentanedione-2,4-(acetyl acetone) and reacting it then with dibutyl tin dichloride in toluene, was mixed with 100 g. of a vinyl chloride resin and 49 g. of di 2-ethyl hexyl phthalate and the mixture was continuously milled on a rubber mill at 325° F. for 1 hour. Samples were removed every 5 minutes and the color change was compared with an identical resin mixture containing no stabilizer and milled on the same mill under identical conditions. The unstabilized mixture was reddish brown after 15 minutes whereas the mixture containing the above organic tin compound was colorless after 1 hour of milling.

*Example 3*

Dibutyl di(butylacetoacetyl) tin of the formula:

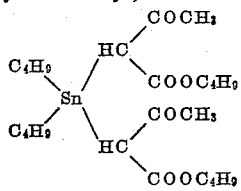

was prepared by reacting first sodium methoxide in toluene with butyl acetoacetate and then adding dibutyl tin dichloride to the thus obtained solution.

1.5 g. of the dibutyl di(butyl acetoacetyl) tin were dissolved in a mixture of 25 g. of dioctyl phthalate and 15 g. of di(-2-ethylhexyl) phenyl phosphate and the solution added to 100 g. of a vinylchloride-maleic ester copolymer. The resin blend was then milled on a roll mill at 325° F. for 10 minutes until a uniformly fluxed sheet was obtained. From this sheet 4 films were heat pressed between polished steel plates at 300° F. and 10,000 p. s. i. pressure for 30 minutes, 45 minutes, 60 minutes and 90 minutes. All four films were perfectly clear and colorless whereas an identical film containing no stabilizer was reddish brown after 30 minutes heat pressing.

*Example 4*

Phenyl sulfonyl acetone was reacted in benzene solution with sodium methoxide and dibutyl tin dichloride to obtain dibutyl di(phenylsulphonylacetonyl) tin of the formula

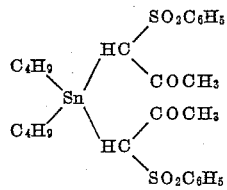

1.8 g. of this compound was added to a resin mix consisting of 63 g. of a vinylchloride-vinyl acetate copolymer containing 95 per cent of vinyl chloride and 5 per cent of vinyl acetate, and 32 g. of di-2-ethylhexyl phthalate, and the mixture was milled on a two-roll mill at 325° F. for 10 minutes and then sheeted out to a film of 0.010 inch thickness. This film was then exposed in the Atlas Fadeometer to ultraviolet light together with films containing no stabilizer. The films containing no stabilizer showed small brown spots after 80 hours' exposure and were dark brown and brittle after 123 hours' exposure. The films containing the above compound showed the first sign of breakdown after 730 hours and showed only a few brown specks after 900 hours' exposure.

*Example 5*

100 g. of a vinyl chloride-vinylidene chloride copolymer resin, 50 g. di-2-ethylhexyl phthalate and 1.5 g. tributyl indenyl tin of the formula

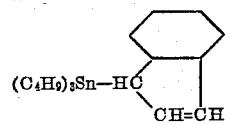

as obtained by reacting an indene-sodium compound with tributyl tin monochloride were blended, then milled on a two-roll mill at 325° F. for 10 minutes until a transparent uniformly fluxed film was obtained. From this film a heat pressed sheet of 6 by 6 inches and 0.040 inch thickness was prepared by pressing it between polished steel plates at 300° F. and 10,000 p. s. i. pressure for 5 minutes. This film was then heated in an air-circulating oven at 340° F. for 1 hr. and 30 min. until discoloration took place. A similar film having no stabilizer turned yellow already after the heat pressing. From the same stabilized sheet a thin 0.010 inch film was sheeted out and exposed in the Atlas Fadeometer. No breakdown as manifested by the appearance of brown spots could be observed after 500 hours of continuous exposure, whereas an identical film containing no stabilizer was discolored after 70 hours' exposure and was brittle and cracked after 120 hours' exposure.

The new stabilizing compounds and their methods of preparation are described and claimed in our copending patent application, Ser. No. 137,676, filed January 9, 1950, now Patent No. 2,604,483, of which this application is a continuation-in-part.

What we claim is:

1. A heat and light resistant plastic composition including as a major constituent a halogen-containing resin and as a stabilizer an organo-tin compound wherein a tetravalent tin atom is linked with each of its four valences to a carbon atom, at least two and not more than three of said carbon atoms being part of a radical selected from the group consisting of alkyl and aryl, the rest of said carbon atoms being each linked to at least two negative groups, at least one of which contains a member selected from the group consisting of CO, COO, CN, SO$_2$, C:C, C⋮C, C:C—C:C, NO$_2$, NO, and conjugated hydrocarbon rings.

2. A heat and light resistant plastic composition as defined in claim 1, wherein the resin is a polymer containing a plurality of vinyl chloride units.

3. A heat and light resistant plastic composition as defined in claim 1, wherein the resin is a conjoint polymer of vinyl chloride with another polymerizable compound.

4. A heat and light resistant plastic composition as defined in claim 1, wherein the resin is essentially a conjoint polymer of vinyl chloride with vinyl acetate.

5. A heat and light resistant plastic composition as defined in claim 1, wherein the resin is essentially a conjoint polymer of vinyl chloride with a maleic ester.

6. A heat and light resistant plastic composition as defined in claim 1, wherein the resin is a polymer containing a plurality of vinylidene chloride units.

7. A heat and light resistant plastic composition including as a major constituent a halogen-containing resin and as a stabilizer dibutyltin di(ethylmalonate) of the formula $$(C_4H_9)_2SnCH(COOC_2H_5)_2$$

8. A heat and light resistant plastic composition including as a major constituent a halogen-containing resin and as a stabilizer dibutyl di(butylacetoacetyl) tin of the formula

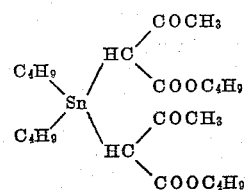

9. A heat and light resistant plastic composition including as a major constituent a halogen-containing resin and as a stabilizer dibutyl di(phenylsulphonylacetonyl) tin of the formula

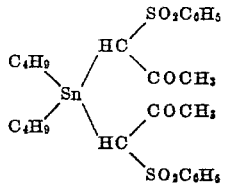

10. A heat and light resistant plastic composition including as a major constituent a halogen-containing resin and as a stabilizer tributyl indenyl tin of the formula $(C_4H_9)_3Sn(C_9H_8)$

References Cited in the file of this patent

UNITED STATES PATENTS 2,604,483     Mack _____ July 22, 1952